United States Patent
Birch (10) Patent No.: US 9,742,642 B2
(45) Date of Patent: *Aug. 22, 2017

(54) MONITORING SMS MESSAGES RELATED TO SERVER/CUSTOMER INTERACTIONS

(71) Applicant: INTERNATIONAL BUSINESS MACHINES CORPORATION, Armonk, NY (US)

(72) Inventor: Oliver Birch, Annapolis, MD (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/683,293

(22) Filed: Apr. 10, 2015

(65) Prior Publication Data

US 2016/0043917 A1    Feb. 11, 2016

Related U.S. Application Data

(63) Continuation of application No. 14/453,704, filed on Aug. 7, 2014.

(51) Int. Cl.
*H04L 12/26* (2006.01)
*H04L 12/58* (2006.01)
*H04W 4/14* (2009.01)

(52) U.S. Cl.
CPC .............. *H04L 43/04* (2013.01); *H04L 51/04* (2013.01); *H04L 51/34* (2013.01); *H04W 4/14* (2013.01)

(58) Field of Classification Search
CPC ....... G06F 21/35–21/36; G06Q 10/107; G06Q 20/02; G06Q 20/32–20/385;

(Continued)

(56) References Cited

U.S. PATENT DOCUMENTS 8,280,776 B2    10/2012    Coulter et al.
8,504,083 B1    8/2013    Gill et al.
(Continued)

FOREIGN PATENT DOCUMENTS

WO    0033203    6/2000
WO    2010092019    8/2010

OTHER PUBLICATIONS

List of IBM Patents or Patent Application Treated as Related—Apr. 16, 2015, pp. 1-2.

(Continued)

*Primary Examiner* — Wing F Chan
*Assistant Examiner* — Raji Krishnan
(74) *Attorney, Agent, or Firm* — Law Office of Jim Boice (57) ABSTRACT

A system, method and/or computer program product monitors delivery of text messages related to network traffic between a user's electronic system and a server. A capture server captures a network traffic message from a user's electronic system to a solution server. In response to capturing a request for specific information from the solution server, the capture server captures a related text message from the solution server to a text message gateway. The capture server then monitors a text message log within the user's electronic system, which contains a record of text messages received by the user's electronic system. In response to the text message log containing no record of the text message from the solution server within a predetermined length of wait time, the capture server generates and transmits an alert message to the solution server.

13 Claims, 3 Drawing Sheets

(58) Field of Classification Search
CPC .......................... G06Q 30/02–30/0241; H04L 43/062–43/0876; H04L 63/08–63/0869; H04L 63/045–63/0471; H04W 4/14; G10L 15/26
See application file for complete search history.

(56) References Cited

U.S. PATENT DOCUMENTS

| | | | |
|---|---|---|---|
| 8,527,417 B2 | 9/2013 | Telle et al. | |
| 2008/0098464 A1* | 4/2008 | Mizrah | G06F 21/36 726/5 |
| 2008/0103972 A1* | 5/2008 | Lanc | G06Q 20/32 705/44 |
| 2009/0254969 A1* | 10/2009 | Parker | G06F 21/554 726/1 |
| 2010/0312657 A1* | 12/2010 | Coulter | G06Q 20/02 705/16 |
| 2011/0143718 A1* | 6/2011 | Engelhart, Sr. | G10L 15/26 455/412.1 |
| 2012/0011066 A1* | 1/2012 | Telle | G06Q 20/385 705/44 |
| 2013/0013921 A1* | 1/2013 | Bhathena | H04L 9/0825 713/168 |
| 2014/0282961 A1* | 9/2014 | Dorfman | H04L 63/0823 726/7 |
| 2014/0289127 A1* | 9/2014 | Suominen | G06Q 20/32 705/64 |
| 2015/0046339 A1* | 2/2015 | Wong | G06Q 20/382 705/71 |
| 2015/0244706 A1* | 8/2015 | Grajek | H04W 12/06 726/6 |
| 2015/0319613 A1* | 11/2015 | Shmilov | G06F 21/35 726/7 |
| 2015/0365420 A1* | 12/2015 | Kochhar | H04L 63/0838 726/6 |
| 2016/0043917 A1* | 2/2016 | Birch | H04L 43/062 709/206 |
| 2016/0043988 A1* | 2/2016 | Birch | H04L 43/062 709/206 |
| 2016/0189147 A1* | 6/2016 | Vanczak | G06Q 20/32 705/71 |

OTHER PUBLICATIONS

IBM Corporation, "IBM Tealeaf CXOverstat", IBM Corporation, USA, 2013, pp. 1-4.

* cited by examiner

MONITORING SMS MESSAGES RELATED TO SERVER/CUSTOMER INTERACTIONS

BACKGROUND

The present disclosure relates to the field of computers, and specifically to the use of computers by customers that utilize services provided by a solution server on a first type of network. More specifically, the present disclosure relates to messages, on a second type of network, that are related to server/customer interactions on the first type of network.

Users are able to access services from service providers that utilize a solution server. For example, a bookkeeping service may utilize a solution server that provides interactive (e.g., web-based) software that allows a user to enter and retrieve data from the solution server. Such communications will typically be over a Transmission Control Protocol/Internet Protocol (TCP/IP) network. Only messages that comport with the TCP/IP protocol can travel over the TCP/IP network. Similarly, TCP/IP protocoled messages are unable to travel over non-TCP/IP networks.

SUMMARY

A system, method and/or computer program product monitors delivery of text messages related to network traffic between a user's electronic system and a server. A capture server captures a network traffic message from a user's electronic system to a solution server. The capture server is capable of monitoring a network over which the network traffic message is transmitted, and the network traffic message is a request for specific information from the solution server. In response to capturing the request for the specific information from the solution server, the capture server captures a text message from the solution server to a text message gateway. The text message is constructed to include the specific information being requested and is addressed to the user's electronic system. However, the capture server is unable to monitor a wireless network used to communicate between the text message gateway and the user's electronic system. The capture server then monitors a text message log within the user's electronic system, which contains a record of text messages received by the user's electronic system. In response to the text message log containing no record of the text message from the solution server within a predetermined length of wait time, the capture server generates and transmits an alert message to the solution server.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
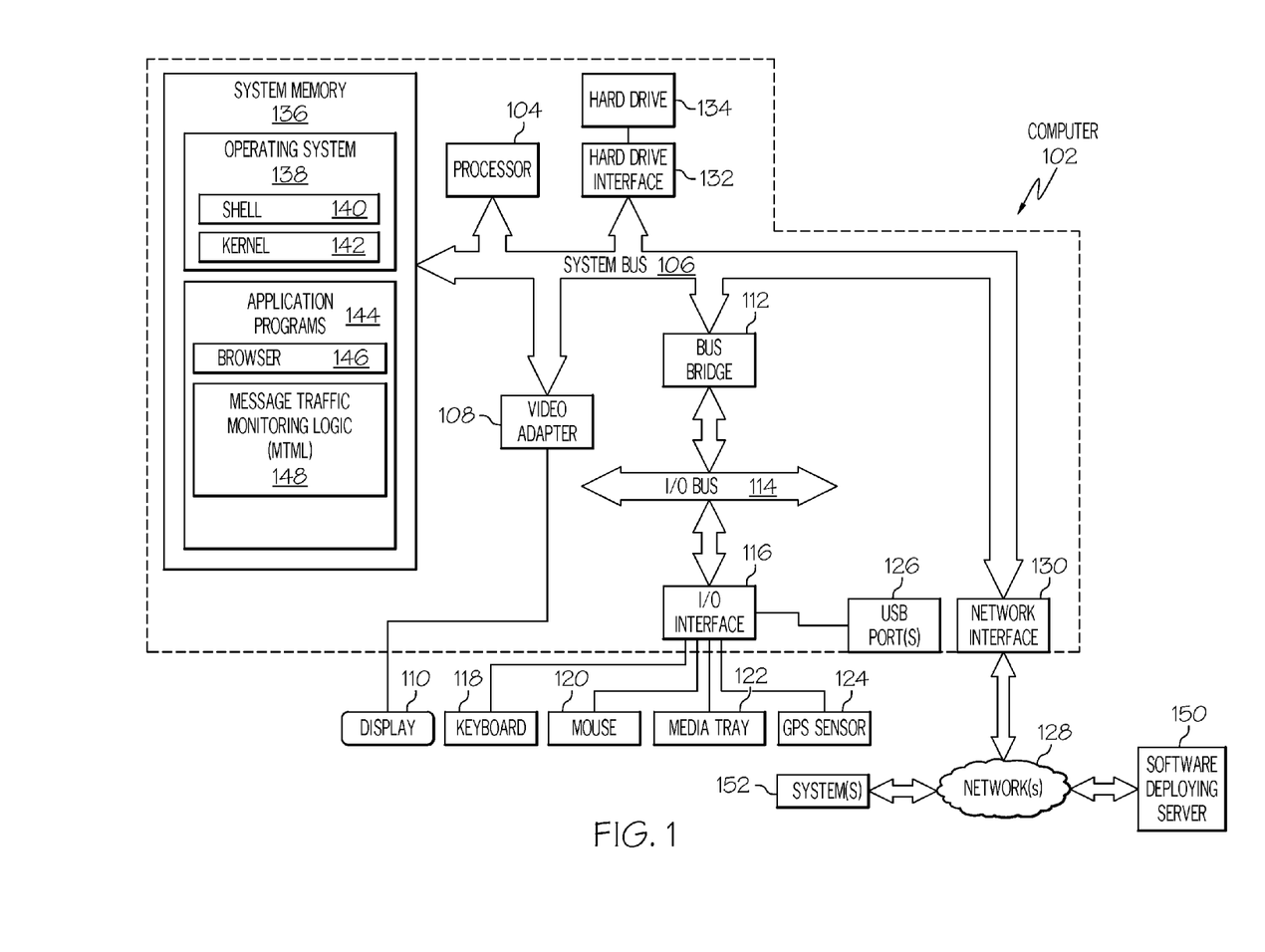
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other system (s) 152, as well as solution server 204, computer 208, cell phone 210, mirror device 212, capture server 214, SMS gateway 218, and/or improper system 226 depicted in FIG. 2.

Figure 2:
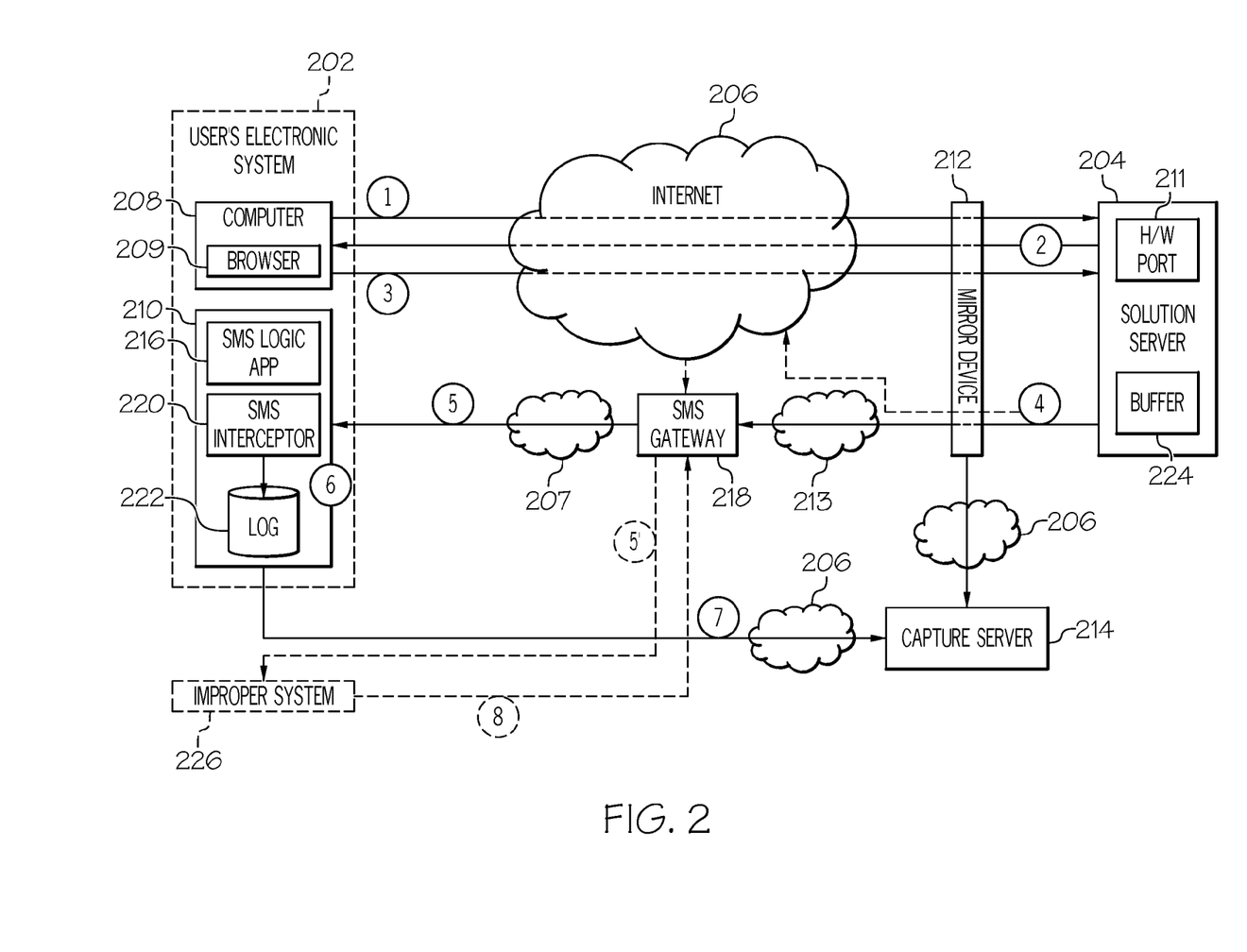
FIG. 2 illustrates an exemplary embodiment of a novel system used to track messages from a network that a capture device is unable to directly monitor, particularly where the messages are related to traffic from a network that the capture device is able to directly monitor.

Note that in one embodiment of the present invention, computer 102 depicts the solution server 204 shown in FIG. 2, while one or more of user's electronic system 202, computer 208, cell phone 210, capture server 214, and/or mirror device 212 shown in FIG. 2 are depicted as system(s) 152. In another embodiment of the present invention, computer 102 depicts the capture server 214 shown in FIG. 2, while one or more of user's electronic system 202, solution server 204, computer 208, cell phone 210, and/or mirror device 212 shown in FIG. 2 are depicted as system(s) 152. That is, computer 102 and system(s) 152 are interchangeable depictions of one or more of the computing systems and/or cell phones and/or gateways (e.g., SMS gateway 218) depicted in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a Global Positioning System (GPS) sensor 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Message Traffic Monitoring Logic (MTML) 148. MTML 148 includes code for implementing the processes described below, including those described in FIGS. 2-3. In one embodiment, computer 102 is able to download MTML 148 from software deploying server 150, including in an on-demand basis, wherein the code in MTML 148 is not downloaded until needed for execution. Note further that, in one embodiment of the present invention, software deploying server 150 performs all of the functions associated with the present invention (including execution of MTML 148), thus freeing computer 102 from having to use its own internal computing resources to execute MTML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary embodiment of a novel system 200 used to track messages from a network that a capture device/server is unable to directly monitor, particularly where the messages are related to traffic from a network that the capture device is able to directly monitor, is presented.

System 200 includes a user's electronic device 202, which is communicatively coupled to a solution server 204 via a first network, depicted as the Internet 206. Internet 206, also simply known as "The Internet", is a global system of interconnected computer networks that use the Transmission Control Protocol/Internet Protocol (TCP/IP) protocol to transmit messages using packets of data. The Internet is often called a "network of networks", since it connects private, public, academic, business, and government networks, using various electronic, wireless, and/or optical networking technologies. Internet traffic includes messages to and from the World Wide Web (WWW), which interlinks hypertext documents (i.e., webpages that use the Hypertext Transfer Protocol—HTTP to represent and transmit information) together.

Thus, messages shown in steps 1-3 and steps 6-7 in FIG. 2 utilize TCP/IP and HTTP protocols to transmit messages.

Another form of electronic communication is text messaging. Text messaging sends short text messages, usually limited to 160 characters, to a mobile device such as a cell phone. An exemplary protocol used for text messaging is the Short Message Service (SMS) protocol, which allows both fixed line and mobile devices (e.g., cell phones) to exchange short text messages.

Text messaging runs on a cellular network. As the name suggests, a cellular network wirelessly transmits data packets to cell phones from towers that are at the epicenter of "cells", or physical areas. Although early cellular protocols were analog (first generation—"1G"), most are now digital. Thus, the second through fifth generation (2G-5G) systems are all digital, where digital data packets are sent to and from cell phones.

Thus, messages shown in steps 4-5 (and/or step 5') in FIG. 2 utilize a text messaging protocol, such as SMS under a 2G-5G (or higher) digital cellular network.

In one or more scenarios, traffic through a cellular network may at some point travel through the Internet. That is, as depicted by dashed lines from the solution server 204 to the Internet 206 to the SMS gateway 218 shown in FIG. 2, an IP based system (e.g., solution server 204) may be able to send IP packets through the Internet (e.g., Internet 206) and on to an SMS gateway (e.g., SMS gateway 218), where the IP packets are converted into digital SMS packets for transmission to a cell phone (e.g., cell phone 210).

In another embodiment, as depicted by the solid lines from the solution server 204 to the SMS gateway 218 shown in FIG. 2, an IP based system (e.g., solution server 204) may be able to first generate an SMS message, which is then sent to an SMS gateway (e.g., SMS gateway 218) for transmission to a cell phone (e.g., cell phone 210).

In either embodiment, however, note that the capture server 214 is unable to monitor which text messages are sent from the SMS gateway 218 and/or received by the cell phone 210. This inability is due to 1) the capture server 214 being unable to monitor the cellular network 207 being used by the SMS gateway 218 to send SMS/text messages to the cell phone 210; and/or 2) the capture server 214 being unable to monitor the SMS gateway 218 itself.

That is, assume that capture server 214 is an Internet-based device, which communicates with other devices/networks via the Internet 206. Thus, the capture server 214 is able to communicate directly with the mirror device 212 and indirectly with the computer 208 via the Internet 206. If the cell phone 210 has IP capabilities (and access to the Internet, via a Wi-Fi hotspot or through an ISP that is in partnership with the cell phone carrier), then the capture server 214 communicates using TCP/IP protocoled messages with the cell phone 210. However, the capture server 214 is not able to communicate using text messages, since the capture server 214 has no access to either the SMS gateway 218 or the cellular network 207, due to technical constraints. That is, the cellular network 207 is a proprietary network that is simply unavailable to the capture server 214, which is only designed to use TCP/IP messaging through the Internet. Thus, even if the capture server 214 was able to communicate with the SMS gateway 218 (which it is not), it still would not be able to determine whether or not any text messages were getting through to the cell phone 210.

Thus, with continued reference to FIG. 2, consider the following scenario. As depicted in step 1, a user (using computer 208) attempts to log in to a service (e.g., a webpage, an application, etc. that provides a service such as bookkeeping, service support, etc.) from the solution server 204 using browser 209. However, in this scenario the user has not entered a correct password to access the service. In one embodiment, this incorrect password (supplied by the user of user's electronic system 202) causes a hardware port 211 within the solution server 204 to become disabled. This hardware port 211 was required to be open in order for the service to be accessible to the user's electronic system 202. By disabling hardware port 211, the solution server 204 must send an error message back to the user's electronic system 202.

Thus, in step 2, the solution server 204 responds with a message back to the computer 208, indicating that the login failed. For example, a failure page (i.e., an HTTP webpage associated with the service) may be sent back to the computer 208, including a prompt to allow the user to request a password reset. As depicted in step 3, the user then requests a password reset by clicking the appropriate section of the failure page.

As shown in step 4, the solution server 204 then sends a request to the SMS Gateway 218 to send an SMS message to the user's mobile phone (cell phone 210). This request contains a Personal Identification Number (PIN) that must be entered on the password reset page to confirm the user's identity. The capture server 214 then logs the request to the SMS gateway 218 (to send the SMS message to the user's mobile phone), including the time, destination address (e.g., port number, cell phone number, Media Access Control—MAC address, etc.), and the requested SMS message contents. The user interaction tracking via the mirror device 212 is interrupted at this point because the SMS message will be sent from the SMS gateway 218 to the user's mobile cell phone 210 via a different channel (i.e., cellular network 207), and the mirror device 212 has no way to detect this.

As shown in step 5, the user's mobile cell phone 210 includes an SMS interceptor application 220, which sees the SMS message arrive from the SMS gateway 218 and writes the SMS message, with a timestamp, to a log 222.

As shown in step 6, the SMS message is received and processed by an SMS logic application 216. The SMS logic application 216 presents the PIN for the password reset page to the user of the computer 208, who then enters this logic reset PIN. Note that in one embodiment, the cell phone 210 and the computer 208 are a same device, while in another embodiment the cell phone 210 and the computer 208 are different devices. In either embodiment, however, the user must enter the logic reset PIN in order to reset the login page for the desired service from the solution server 204.

As shown in step 7, the log containing information about the SMS message, including timestamps of when the SMS message left the solution server 204, arrived at the SMS gateway 218, left the SMS gateway 218, arrived at the SMS logic application 216 and/or the SMS interceptor 220; the PIN number within the SMS message itself; an identifier of the solution server 204 that requested/sent the SMS message; and/or other information including, but not limited to, that related to the service being requested and/or a history of steps taken to access this service (from steps 1-3 etc.) is sent back to the capture server 214 over the Internet 206. If the SMS message is actually within the log 222, then the capture server 214 uses the timestamp(s), contents and other attributes of the SMS message to correlate the SMS message with the previously captured user interaction flow (from steps 1-3). Thus, it is possible to determine if there was a significant delay in receipt of the SMS message, which may cause the login procedure to fail due to missing a timeout window. In another scenario, the message is entirely absent from the log, thus explaining why the user never reset the login page.

Figure 3:
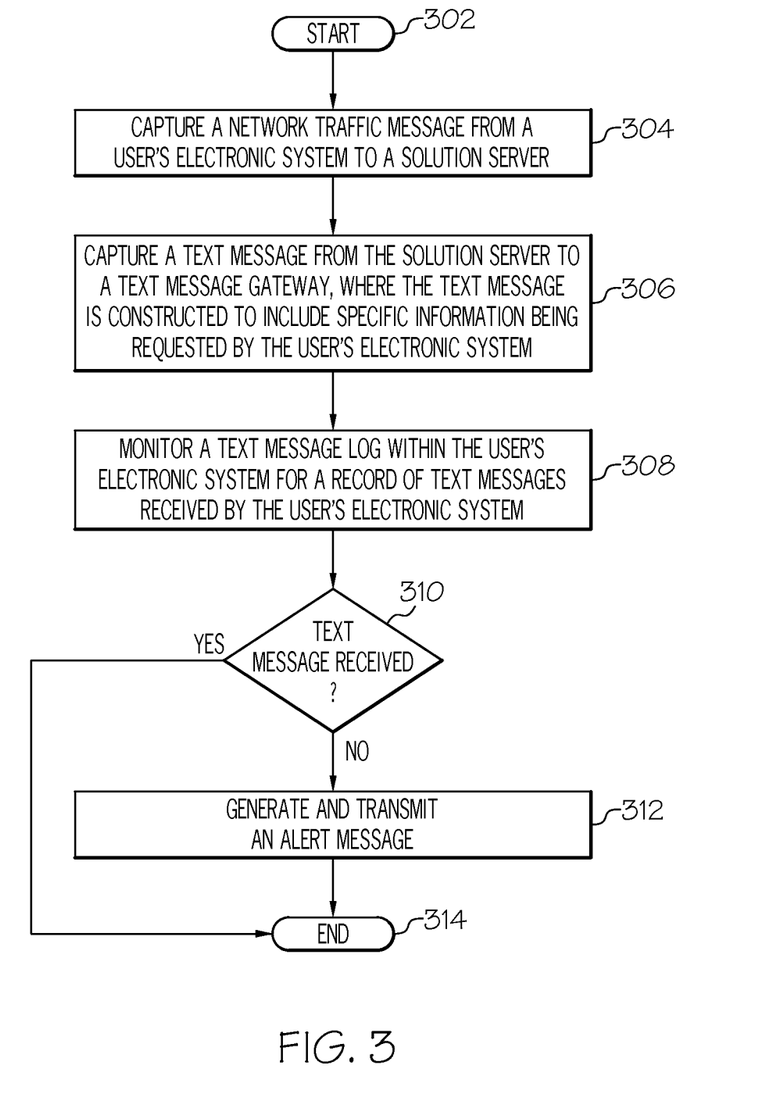
FIG. 3 is a high-level flowchart of one or more steps performed by one or more processors to monitor delivery of text messages related to network traffic between a user's electronic system and a solution server.

With reference now to FIG. 3, a high-level flowchart of one or more steps performed by one or more processors to monitor delivery of text messages related to network traffic between a user's electronic system and a server (such as solution server 204 shown in FIG. 2) is presented.

After initiator block 302, a capture server (e.g., capture server 214 shown in FIG. 2) captures a network traffic message (e.g., one or more of the network traffic messages described in steps 1-3 in FIG. 2) from a user's electronic system (e.g., computer 208 in FIG. 2) to a solution server (e.g., solution server 204 shown in FIG. 2), as described in block 304 of FIG. 3. As described herein, the capture server is capable of monitoring a network over which the network traffic message is transmitted (e.g., the Internet 206 shown in FIG. 2), but is unable to monitor a wireless network (e.g., cellular network 207 shown in FIG. 2) used to communicate between a text message gateway (e.g., SMS gateway 218 shown in FIG. 2) and the user's electronic system (e.g., cell phone 210 shown in FIG. 2). As described herein, the network traffic message (e.g., a TCP/IP, HTTP, or similar message that travels through an IP-based system such as the Internet, but is unable to travel through an SMS/cell phone network) is a request for specific information from the solution server (see step 1 described with FIG. 2).

As described in block 306 of FIG. 3, in response to capturing the request for the specific information from the solution server, the capture server then captures a text message from the solution server to a text message gateway (see step 4 in FIG. 2). This text message (e.g., SMS message) is constructed to include the specific information being requested, such as a PIN number needed to reset a login page. Note further that this text message is addressed to the user's electronic system. More specifically, the text message is addressed to the cell phone component (element 210 in FIG. 2) of the user's electronic system (element 202 in FIG. 2). The address is identified by the cell phone's telephone number, MAC address, etc.

As described in block 308 of FIG. 3, the capture server monitors (through access provided by the Internet 206, but not the cellular network 207, shown in FIG. 2) a text message log (element 222 in FIG. 2) within the user's electronic system. As described herein, the text message log contains a detailed record of text messages received by the user's electronic system.

As described in query block 310, a query is made to the cell phone 210 by the capture server 214 as to whether or not the cell phone 210 received the text message within a predetermined amount of time. In another embodiment, the cell phone 210 transmits the contents of the capture log 222 1) whenever the cell phone 210 receives a text message, and/or 2) at certain predefined periodic time intervals. In either embodiment, the capture server 214 is able to determine when the text/SMS message was sent from the solution server 204 (see step 4), and is able to see in the log 222 when, if ever that text/SMS message was received by the cell phone 210. In response to the text message log containing no record of the text message from the solution server within a predetermined length of wait time (i.e., the text/SMS message never reached the cell phone or else it arrived after a timeout window had expired), then the capture server generates and transmits an alert message to the solution server 204 and/or the user's electronic system 202 and/or a monitoring server (not depicted in FIG. 2). Note that in one embodiment, the "timeout window" is a window of time established by the solution server that defines how much time is allowed the user to reset his password information. If this timeout window expires, then the user, even with the requisite PIN needed to reset the service/page/password, will be blocked from doing so.

The process depicted in FIG. 3 ends at terminator block 314.

In one embodiment of the present invention, the capture server captures the network traffic message and the text message from a mirror device (e.g., mirror device 212 shown in FIG. 2). This mirror device maintains a log of network traffic messages sent to and from the solution server (e.g., from steps 1-3 described for FIG. 2). This mirror device also maintains a log of text messages sent from the solution server (see step 4 described for FIG. 2). Again, note that the mirror device is unable to monitor the wireless network (e.g., element 207 in FIG. 2) used to communicate between the text message gateway (e.g., element 218 in FIG. 2) and the user's electronic system (e.g., element 220 in FIG. 2).

As described herein, in one embodiment of the present invention, the network traffic message is related to an interaction between a user of the user's electronic system and a service provided by the solution server, as described in steps 1-3 in FIG. 3.

In one embodiment of the present invention, the capture server is unable to communicate with the text message gateway. That is, although the capture server 214 can capture an SMS message being sent from the solution server 204, the capture server 214 is nonetheless unable to communicate with the SMS gateway 218 itself. This inability may be due to several economic, business, and/or technical factors. For example, communication with the SMS gateway 218 may require a relationship with a cellular carrier (i.e., a mobile phone service), which the capture server 214 does not have (i.e., is not connected to a wireless network 213 required to access the SMS gateway). Rather, in this embodiment the capture server 214 is only able to communicate via the Internet 206, which cannot directly access the SMS gateway 218.

As described herein, in one embodiment of the present invention the text message provider gateway is a Short Message Service (SMS) gateway (element 218 shown in FIG. 2).

As described herein, in one embodiment of the present invention the network traffic message is a failed attempt by the user's electronic system to log into a service provided by the solution server (see step 1 in FIG. 2). The specific information being requested in this embodiment is a reset password for logging into the service. This reset password may be expressly requested ("Please send me a reset password"), or it may be implicitly requested ("Please send me information needed to reset my password"), or it may be information discerned as being necessary by the solution server (i.e., if the user's attempt to login fail, the solution server will "know" to send the user the text/SMS message with the requisite PIN, as described herein).

As described herein, in one embodiment of the present invention the user's electronic system (element 202 in FIG. 2) comprises a computer (element 208 in FIG. 2) and a cell phone (element 210 in FIG. 2). In one embodiment, the computer exchanges network traffic messages with the solution server, and the cell phone receives the text message from the solution server.

In one embodiment of the present invention, in response to the text message log containing no record of the text message from the solution server within the predetermined length of wait time, the capture server generates and transmits an instruction to the computer to re-send the network traffic message requesting the specific information from the solution server. That is, in one embodiment of the present invention, if the SMS message never appears on the cell phone log within a predefined (e.g., timeout) period of time, then the capture server sends a message directly to the computer 208, instructing the user to re-try logging into the service desired from the solution server. This will result in 1) the user using the correct original password/login procedure, or 2) the solution server 204 once again sending the text/SMS message with the reset PIN.

In one embodiment of the present invention, the capture server 214 determines that the cell phone 210 is within a dead reception zone in which the cell phone is unable to receive the text message. That is, assume that the cell phone 210 includes a GPS sensor (e.g., GPS sensor 124 shown in FIG. 1). Assume further that 1) the capture server 214 has a record of areas within which cellular service from cellular network 207 is unavailable, and that 2) the capture server 214 is nonetheless able to receive GPS data via from the user's electronic system 202 via the Internet 206 (assuming that the cell phone 210 and the computer 208 are able to communicate with each other, as in the scenario in which the computer 208 and cell phone 210 are simply components of a same "smart phone"). Thus, the capture server 214 is subsequently able to identify movement of the cell phone 210 out of the dead reception zone. In response to identifying that the cell phone 210 has moved out of the dead reception zone, the capture server 214 then issues an instruction to the solution server 204 to re-send, to the cell phone 210, the text message that includes the specific information being requested (e.g., a PIN number and/or instructions for resetting the login page, password, etc. for the service being requested from the solution server 204).

In another embodiment, the position of the cell phone 210 (and thus potentially being within a dead reception zone in which text messages are unable to be received) is established by an interrogation of a radio frequency identification (RFID) chip that is on board the cell phone 210. The interrogation is performed by a radio transceiver that interrogates the RFID chip. If the RFID chip responds within the dead reception zone, then the radio transceiver sends a signal to a monitoring server (e.g., one of the system(s) 152 shown in FIG. 1) on a local network (e.g., hardwired). The monitoring server then provides information to the capture server 214 and/or the solution server 204 that the cell phone 210 is in an area in which it is unable to receive text messages.

In one embodiment of the present invention, the capture server 214 detects a precursive message from the computer 208, where the precursive message has been predetermined to indicate a probability, above a predefined likelihood, that the specific information (e.g., PIN and/or reset instructions) will be requested subsequent to the computer 208 sending the network traffic message to the solution server 204. An exemplary precursive message may be a second or third unsuccessful attempt to log into a service provided by the solution server 204. Logic within the capture server 214, seeing these unsuccessful attempts in the mirror device 212, will then predict that the user will try one last time to log in without success (at which time the solution server 204 will "lock" that user out). Thus, in response to detecting the precursive message(s), the capture server 214 will issue an instruction to the solution server 204 to buffer (e.g., within a buffer 224 shown in FIG. 2) the text/SMS message containing the specific information (e.g., PIN and reset instructions). Thus, the text/SMS message will be available for immediate transmission to the SMS gateway 218, in order to avoid delays during which the user will not know what is happening to his failed request.

In one embodiment of the present invention, in response to the text message log (element 222 in FIG. 2) containing a record of the text message from the solution server, the capture server compares the text message from the solution server with the text message found in the text message log. That is, assume that the solution server 204 is able to generate the text/SMS message itself. In this embodiment, the capture server 214 has a copy of the original text/SMS message as captured during step 4 in FIG. 2. The capture server 214 also has a copy of the received text/SMS message from the log 222 in the cell phone 210. In response to the text message from the solution server 204 failing to match the text message found in the text message log 222, the capture server will issue an alert (to the computer 208, the solution sever 204, and/or to a third part monitoring server—not shown in FIG. 2) that indicates that the text message has been corrupted.

In one embodiment of the present invention, if the text message transmitted from the solution server (step 4 in FIG. 2) and the text message that was actually received by the cell phone (as shown in log 222 in FIG. 2) do not match, then the capture server 214 will issue an alert indicating that the text message has been intercepted by a third party system that is unauthorized to receive the text message. That is, as depicted by step 5' in FIG. 2, an improper system 226 (e.g., an unauthorized cell phone, a server being used by a hacker, etc.) has intercepted the text/SMS message at the SMS gateway 218. The user of the improper system 226 has returned the intercepted text/SMS message back to the SMS gateway 218, as shown in step 8. Thus, the text/SMS message being sent in step 5 depicted in FIG. 2 is actually the corrupted/coopted text/SMS message depicted in step 8 in FIG. 2. Note that this interception has resulted in a slight change to the text/SMS message, such as a newly-added record of an address of the intermediary recipient (improper system 226), an unexplained time delay, a change in the PIN found in the original text/SMS message sent from the solution server 204 and that found in the received text/SMS message stored in the log 222 of the authorized cell phone 210, etc. Such anomalies are interpreted as evidence of an unauthorized interception of the text/SMS message that contained the PIN and instructions to reset the login page.

In one embodiment of the present invention, the network traffic message (e.g., from steps 1-3 in FIG. 2) includes a first identifier of a user of the user's electronic device 202, and the text message (e.g., from steps 4-5 in FIG. 2) includes a second identifier of the user of the user's electronic device 202. That is, both the Internet traffic and the cell phone traffic contain identifications of the same user who is using the computer 208 and the cell phone 210. In one embodiment of the present embodiment, in response to the text message log 222 containing a record of the text message from the solution server 204, the capture server 214 compares the first identifier of the user from the network traffic message (e.g., from steps 1-3 of FIG. 2) to the second identifier of the user from the text message (e.g., from steps 4-5 of FIG. 2). In response to the first identifier of the user from the network traffic message failing to match the second identifier of the user from the text message, the capture server 214 issues an alert (to the solution server 204, to the computer 208, to the cell phone 210, and/or to a monitoring service—not shown in FIG. 2) indicating that the text message has been erroneously sent to a wrong cell phone.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for monitoring delivery of text messages related to network traffic between a user's electronic system and a solution server, the method comprising:
    capturing, by a capture server, a network traffic message from a user's electronic system to a solution server, wherein the capture server is capable of monitoring a network over which the network traffic message is transmitted, and wherein the network traffic message is a request for specific information from the solution server;
    in response to capturing the request for the specific information from the solution server, capturing, by the capture server, a text message from the solution server to a text message gateway, wherein the text message is constructed to include the specific information being requested, wherein the text message is addressed to the user's electronic system, and wherein the capture server is unable to monitor a wireless network used to communicate between the text message gateway and the user's electronic system;
    monitoring, by the capture server, a text message log within the user's electronic system, wherein the text message log contains a record of text messages received by the user's electronic system; and
    in response to the text message log containing no record of the text message from the solution server within a predetermined length of wait time, the capture server generating and transmitting an alert message to the solution server.

2. The method of claim 1, further comprising:
    capturing, by the capture server, the network traffic message and the text message from a mirror device, wherein the mirror device maintains a log of network traffic messages sent to and from the solution server, wherein the mirror device maintains a log of text messages sent from the solution server, and wherein the mirror device is unable to monitor the wireless network used to communicate between the text message gateway and the user's electronic system.

3. The method of claim 1, wherein the network traffic message is related to an interaction between a user of the user's electronic system and a service provided by the solution server.

4. The method of claim 1, wherein the capture server is unable to communicate with the text message gateway.

5. The method of claim 1, wherein the text message gateway is a Short Message Service (SMS) gateway.

6. The method of claim 1, wherein the network traffic message is a failed attempt by the user's electronic system to log into a service provided by the solution server, and wherein the specific information being requested is a reset password for logging into the service.

7. The method of claim 1, wherein the user's electronic system comprises a computer and a cell phone, wherein the computer exchanges network traffic messages with the solution server, and wherein the cell phone receives the text message from the solution server.

8. The method of claim 7, further comprising:

in response to the text message log containing no record of the text message from the solution server within the predetermined length of wait time, the capture server generating and transmitting an instruction to the computer to re-send the network traffic message requesting the specific information from the solution server.

9. The method of claim 7, further comprising:

determining, by the capture server, that the cell phone is within a dead reception zone in which the cell phone is unable to receive the text message;

identifying, by the capture server, movement of the cell phone out of the dead reception zone; and in response to identifying that the cell phone has moved out of the dead reception zone, issuing, by the capture server, an instruction to the solution server to re-send, to the cell phone, the text message that includes the specific information being requested.

10. The method of claim 7, further comprising:

detecting, by the capture server, a precursive message from the computer, wherein the precursive message has been predetermined to indicate a probability, above a predefined likelihood, that the specific information will be requested subsequent to the computer sending the network traffic message to the solution server; and in response to detecting the precursive message, issuing, by the capture server, an instruction to the solution server to buffer the text message containing the specific information.

11. The method of claim 1, further comprising:

in response to the text message log containing a record of the text message from the solution server, the capture server comparing the text message from the solution server with the text message found in the text message log; and in response to the text message from the solution server failing to match the text message found in the text message log, the capture server issuing an alert indicating that the text message has been corrupted.

12. The method of claim 1, further comprising:

in response to the text message log containing a record of the text message from the solution server, the capture server comparing the text message from the solution server with the text message found in the text message log; and in response to the text message from the solution server failing to match the text message found in the text message log, the capture server issuing an alert indicating that the text message has been intercepted by a third party system that is unauthorized to receive the text message.

13. The method of claim 1, wherein the network traffic message includes a first identifier of a user of the user's electronic device, wherein the text message includes a second identifier of the user of the user's electronic device, and wherein the method further comprises:

in response to the text message log containing a record of the text message from the solution server, the capture server comparing the first identifier of the user from the network traffic message to the second identifier of the user from the text message; and in response to the first identifier of the user from the network traffic message failing to match the second identifier of the user from the text message, the capture server issuing an alert indicating that the text message has been erroneously sent to a wrong cell phone.

* * * * *